(12) United States Patent
Haraguchi

(10) Patent No.: US 9,591,838 B2
(45) Date of Patent: Mar. 14, 2017

(54) CLUTCH OPERATING MEMBER OF A DUAL-BEARING REEL

(71) Applicant: Shimano Inc., Sakai, Osaka (JP)

(72) Inventor: Hitoshi Haraguchi, Osaka (JP)

(73) Assignee: Shimano Inc., Osaka (JP)

( * ) Notice: Subject to any disclaimer, the term of this patent is extended or adjusted under 35 U.S.C. 154(b) by 302 days.

(21) Appl. No.: 14/609,250

(22) Filed: Jan. 29, 2015

(65) Prior Publication Data

US 2015/0296762 A1 Oct. 22, 2015

(30) Foreign Application Priority Data

Apr. 16, 2014 (JP) .................................. 2014-84915

(51) Int. Cl.
*A01K 89/01* (2006.01)
*A01K 89/015* (2006.01)

(52) U.S. Cl.
CPC ........ *A01K 89/015* (2013.01); *A01K 89/0186* (2015.05); *A01K 89/0189* (2015.05)

(58) Field of Classification Search
CPC .............. A01K 89/015; A01K 89/0186; A01K 89/0188; A01K 89/0189; A01K 89/01901
See application file for complete search history.

(56) References Cited

U.S. PATENT DOCUMENTS

| | | | | |
|---|---|---|---|---|
| 4,575,024 A | * | 3/1986 | Kaneko ................ | A01K 89/015 242/261 |
| 4,593,869 A | * | 6/1986 | Yasui ................... | A01K 89/015 242/261 |
| 4,709,874 A | * | 12/1987 | Murakami ........... | A01K 89/015 192/93 R |
| 5,222,995 A | * | 6/1993 | Sato ..................... | A01K 89/015 242/258 |
| 5,350,133 A | * | 9/1994 | Morimoto ............ | A01K 89/015 242/261 |
| 5,996,919 A | * | 12/1999 | Murayama ........... | A01K 89/015 242/261 |
| 6,003,801 A | * | 12/1999 | Kobayashi ........... | A01K 89/015 242/310 |
| 2007/0181728 A1 | * | 8/2007 | Kawasaki ............. | A01K 89/00 242/310 |
| 2012/0067993 A1 | * | 3/2012 | Nakagawa ........... | A01K 89/015 242/257 |
| 2012/0104135 A1 | * | 5/2012 | Toma ................... | A01K 89/015 242/227 |

FOREIGN PATENT DOCUMENTS

JP 4963279 B2 4/2012

* cited by examiner

*Primary Examiner* — Emmanuel M Marcelo
(74) *Attorney, Agent, or Firm* — Global IP Counselors

(57) ABSTRACT

A clutch operating member for a dual-bearing reel is disposed at a rear of a reel body of the dual-bearing reel and casts a fishing line in a forward direction. The clutch operating member includes a movable part and a first operating unit. The movable part is movably disposed on the reel body, and is configured to be selectively disposed between a clutch-off position which sets the clutch mechanism in the clutch-off state and a clutch-on position which sets the clutch mechanism in the clutch-on state. The first operating unit has a first end and a second end, is pivotably coupled to the movable part at the first and second ends, and is configured to return the movable part from the clutch-off position to the clutch-on position.

20 Claims, 7 Drawing Sheets

CLUTCH OPERATING MEMBER OF A DUAL-BEARING REEL

CROSS-REFERENCE TO RELATED APPLICATIONS

This application claims priority to Japanese Patent Application No. 2014-84915 filed on Apr. 16, 2014, the entirety of which is hereby incorporated by reference.

BACKGROUND

Field of the Invention

The present invention relates to an operating member and, in particular, to a clutch operating member of a dual-bearing reel that is provided to the rear of a reel body of a dual-bearing reel that delivers a fishing line forward and that is for returning a clutch mechanism from a clutch-off state to a clutch-on state.

Background Information

A conventionally known example of a reel body of a dual-bearing reel has a clutch operating member in the rear for operating a clutch mechanism. A conventionally known example of such a clutch operating member has first and a second operating units for clutch-on operations and a third operating unit for clutch-off operations (refer to, for example, U.S. Pat. No. 4,963,279). A conventional clutch operating member comprises a first operating unit and a second operating unit for moving the clutch mechanism into the clutch-on state. The first operating unit and the second operating unit are curved at an interval at both ends of the outer peripheral side of a spool. The first operating unit and the second operating unit are coupled by a third operating unit for clutch-off operation. Therefore, the third operating unit is generally formed into a U-shape in the clutch operating member. In a conventional clutch operating member for a dual-bearing reel, thumbing can be done by putting the tip of the thumb of the hand that is gripping the reel in contact with a flange, and the clutch-on operation can be completed by pressing at least either the first operating unit or the second operating unit with the tip of the thumb.

In a conventional clutch operating member, the tip of the thumb can reach the flange of the spool when thumbing by sliding a part that is curved and connected to either the first or the second operating unit.

However, in a conventional clutch operating member, sliding the finger from the part that is curved and connected to either the first operating unit or the second operating unit again is necessary in order to perform thumbing. Consequently, instantaneously performing a clutch return operation for returning the clutch operating member to the clutch-on position is difficult.

The object of the present invention is to provide a clutch operating member that is able to perform a clutch-on operation instantaneously, even during a thumbing operation.

SUMMARY

The clutch operating member of a dual-bearing reel according to the present invention is disposed in the rear of a reel body of a dual-bearing reel for casting fishing line in a forward direction. The clutch operating member is configured to return a clutch mechanism from a clutch-off state to a clutch-on state. The clutch operating member comprises a movable part and a first operating unit. The movable part is movably disposed on the reel body between a clutch-off position for putting the clutch mechanism in the clutch-off state and a clutch-on position for putting the clutch mechanism in the clutch-on state. The first operating unit is pivotably coupled to the movable part at both ends and is configured to return the movable part from the clutch-off position to the clutch-on position.

In this clutch operating member of a dual-bearing reel, the movable part is moved from the clutch-on position to the clutch-off position when putting the clutch mechanism in the clutch-off state and casting the fishing line. The movable part is also returned from the clutch-off position to the clutch-on position by operating the first operating unit when returning the clutch mechanism from the clutch-off state to the clutch-on state. The first operating unit is pivotably coupled to the movable part at both ends. For this reason, it is possible to perform a thumbing operation by pivoting the first operating unit in a direction approaching the spool in a state in which a finger (thumb) presses the first operating unit. Accordingly, it is possible to instantaneously perform a clutch return operation with a thumbing operation.

The first operating unit can be made of a metal wire having elasticity. In this embodiment, it is possible to make the first operating unit have an inconspicuous appearance by bending the metal wire into an inverted U-shape and pivotably connecting both ends to the movable part. Additionally, emphasizing the characteristics of the appearance of the first operating unit is possible by conducting a decoration process, such as plating.

The reel body comprises a first side plate and a second side plate that are disposed at an interval in a lateral direction that intersects with the longitudinal direction. The movable part can be movably disposed between the first side plate and the second side plate. In this embodiment, since the movable part is guided at both ends, the movable part is less likely to tilt laterally.

The length of the first operating unit can be longer than the gap between the first side plate and the second side plate. In this embodiment, the first operating unit can be easily bent.

The first operating unit can be disposed to be curved. In this embodiment, operating the first operating unit with the thumb of a hand gripping the dual-bearing reel is simple.

The first operating unit can be detachably disposed on the movable part. In this embodiment, an angler performing a clutch-on operation without using the first operating unit is able to detach the first operating unit and select a first operating unit according to the preference of the angler. For example, an angler who performs an operation for the clutch-on position with the movable part or an angler who performs an operation to return the clutch mechanism from the clutch-off position to the clutch-on position by rotating a handle in the line winding direction can detach the first operating unit.

The first operating unit can be movably coupled with the movable part in the longitudinal direction at both ends. In this embodiment, since the first operating unit is rotated in the longitudinal direction, performing a clutch-on operation by rearward placement is possible, and dealing with backlash from the rearward placement is easy.

The clutch operating member can further comprise a second operating unit that is disposed on the movable part and is for moving the movable part from the clutch-on position to the clutch-off position. In this embodiment, operating from the clutch-on position to the clutch-off position with the second operating unit is simple.

According to the present invention, it is possible to use the thumb to pivot the first operating unit in a direction approaching the spool in a state in which a finger (thumb)

presses the first operating unit. Accordingly, it is possible to instantaneously perform a clutch return operation from a thumbing operation.

BRIEF DESCRIPTION OF THE DRAWINGS

Referring now to the attached drawings which form a part of this original disclosure.

DETAILED DESCRIPTION OF THE EMBODIMENTS

First Embodiment

Figure 1:
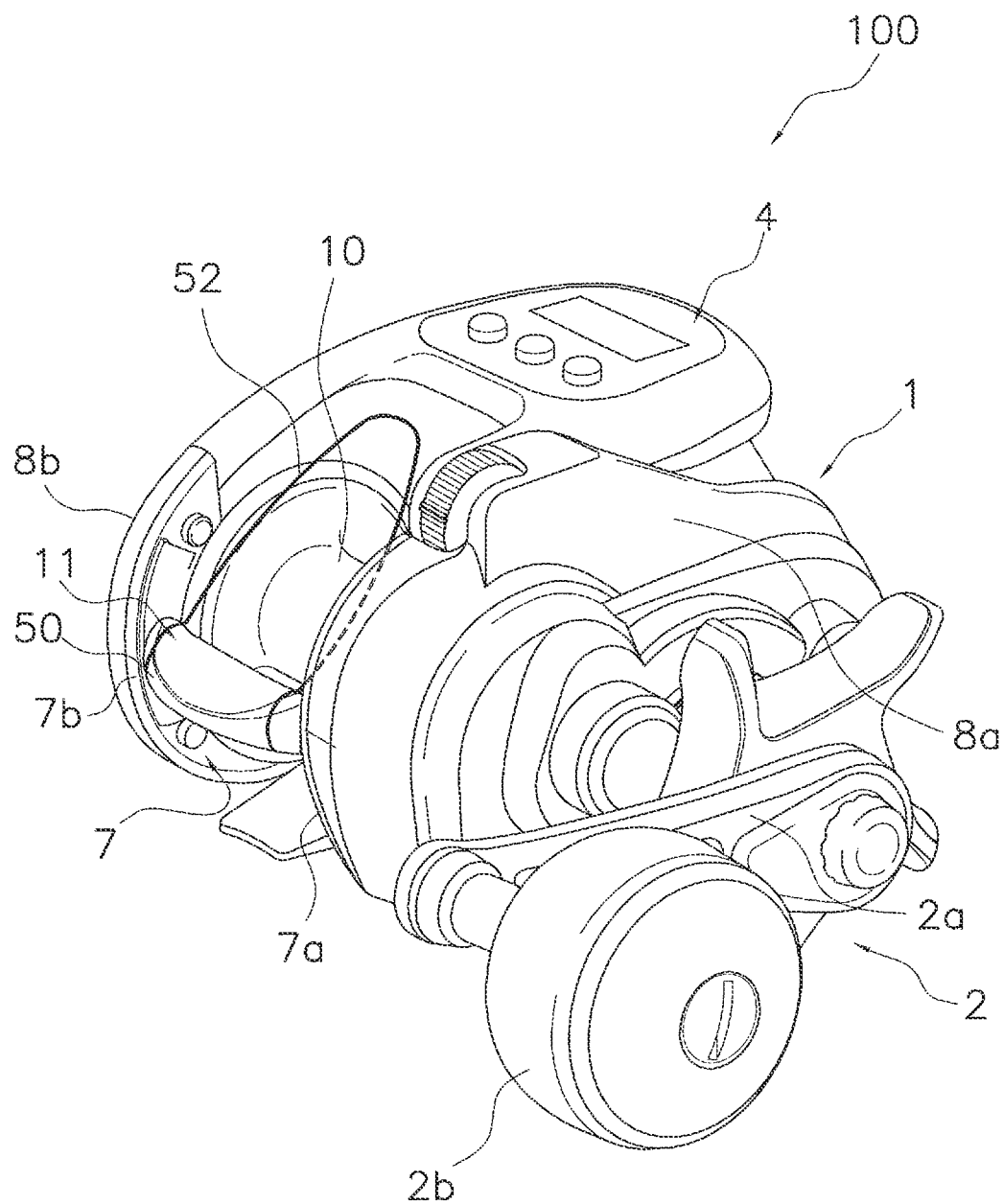
FIG. 1 is a perspective view of a dual-bearing reel employing a first embodiment of the present invention.

In FIG. 1, the dual-bearing reel employing the first embodiment of the present invention is a small electric reel 100 that drives (or casts) a fishing line in a forward direction with electric power supplied by an external power source and that also has an internal power source for use as a hand-wound reel. Additionally, the electric reel 100 has a water depth display function for displaying the water depth of the tackle according to the casted line length or the line winding length.

The electric reel 100 comprises a reel body 1, a handle 2, a water depth display unit 4 for displaying the water depth of the tackle, a spool 10 for line winding, a clutch operating member 11, a motor (not shown), a spool drive mechanism 13, and a clutch mechanism 16. The handle 2 is rotatably disposed on the reel body 1. The spool 110 is rotatably disposed on the reel body 1. The clutch operating member 11 is for operating the clutch mechanism 16 to the ON and OFF state and is movably disposed at the rear of the reel body 1. The motor is disposed on the reel body 1 and rotates the spool 10. With an operation of the clutch operating member 11, the clutch mechanism 16 is able to switch between a clutch-on state that can transmit the rotation of the handle 2 to the spool 10 and a clutch-off position that cannot transmit the rotation of the handle 2 to the spool 10.

Reel Body

Figure 2:
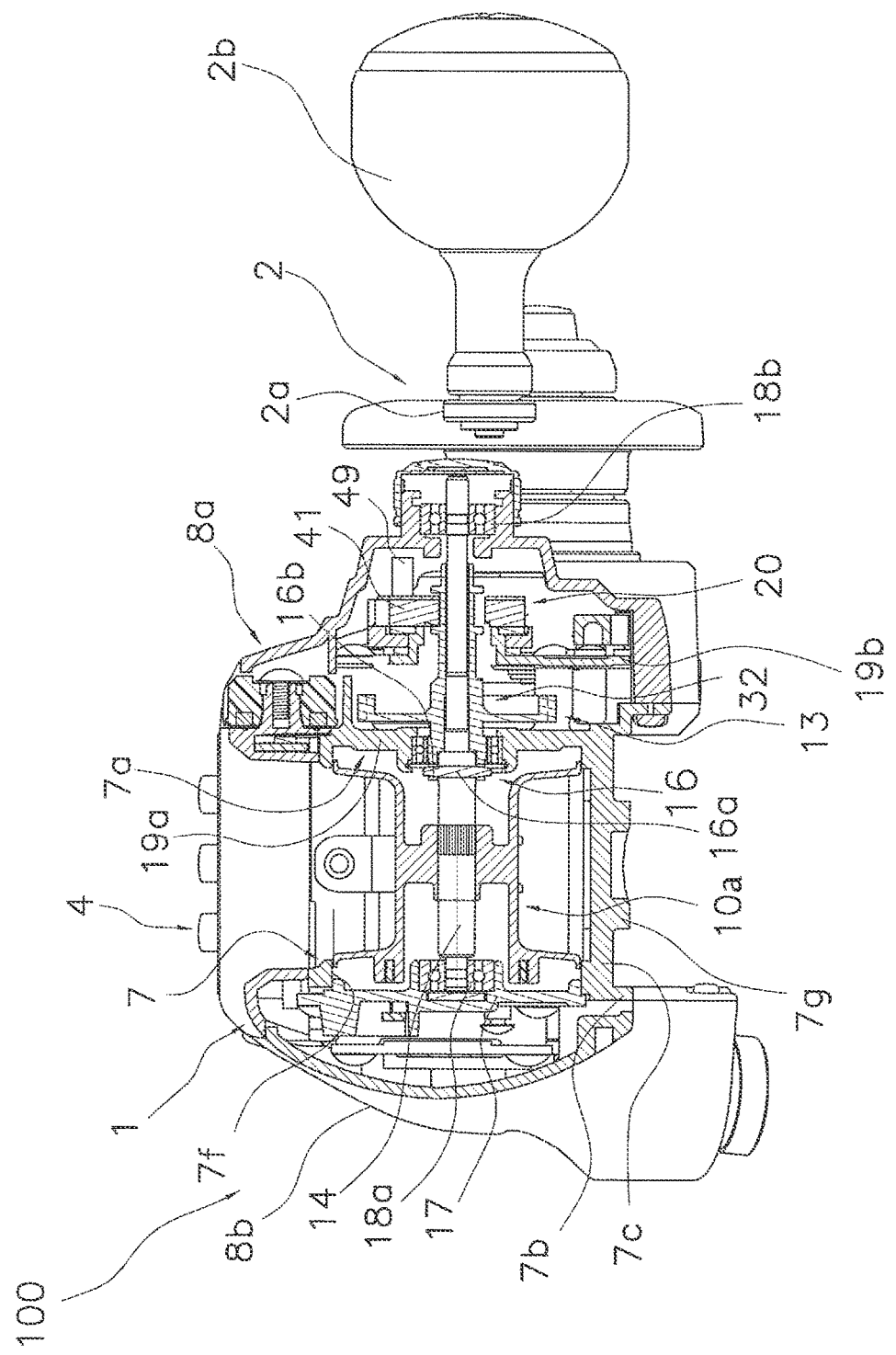
FIG. 2 is a rear cross-sectional view of the dual-bearing reel.
Figure 3:
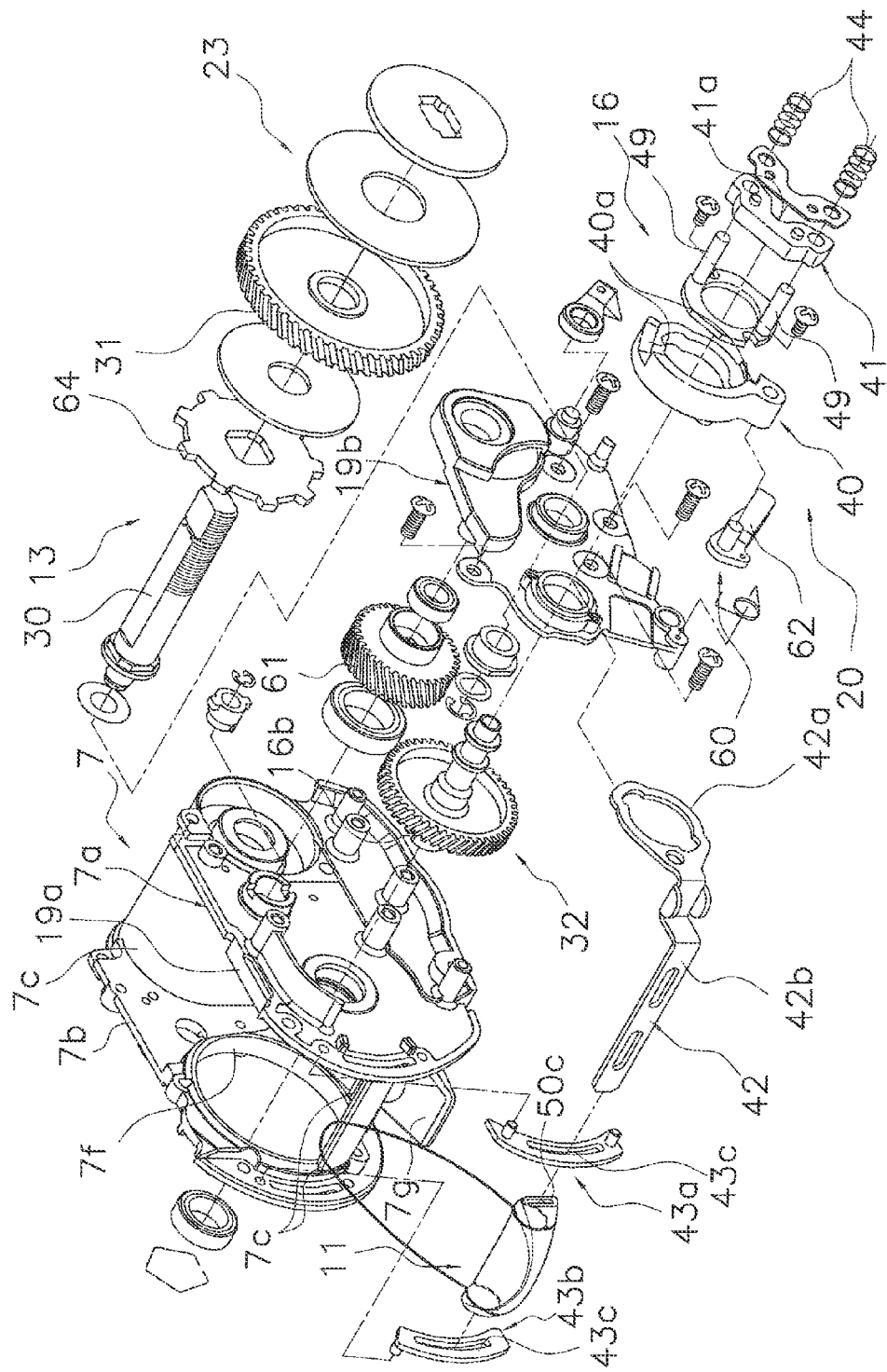
FIG. 3 is an exploded perspective view of the dual-bearing reel comprising a clutch operating member.

The reel body 1 comprises a frame 7, a first side cover 8a, and a second side cover 8b. The frame 7 is, for example, an integrally formed synthetic resin or a metallic member, as shown in FIG. 2 and FIG. 3. The frame 7 comprises a first side plate 7a, a second side plate 7b, and a plurality of coupling members 7c that couple the first side plate 7a and the second side plate 7b. A fishing rod mounting portion 7g for mounting the electric reel 100 to the fishing rod is disposed on the coupling member 7c that is disposed on the bottom. The second side plate 7b is disposed so as to be spaced apart from the first side plate 7a in the lateral direction (the horizontal direction in FIG. 2). As shown in FIG. 1, the first side cover 8a covers the handle 2 mounting side of the frame 7. The second side cover 8b covers the opposite side of the handle 2 mounting side of the frame 7.

As shown in FIG. 2, the first side plate 7a comprises a side plate body 19a and a mechanism mounting plate 19b that is disposed so as to be spaced apart from the side plate body 19a and is for mounting various mechanisms. The mechanism mounting plate 19b is screwed to the outer side surface of the side plate body 19a. A spool drive mechanism 13, a clutch control mechanism 20 for controlling the clutch mechanism 16, and a drag mechanism 23 for braking the rotation of the spool 10 in the line casting direction (refer to FIG. 3) are disposed between the side plate body 19a and the first side cover 8a.

A circular opening 7f through which the spool 10 can pass is formed on the second side plate 7b, as shown in FIG. 2. A spool support portion 17 that rotatably supports a first end (the left end in FIG. 2) of a spool shaft 14 of the spool 10 is centered and mounted to the circular opening 7f. The spool support portion 17 is screwed to the outer side surface of the second side plate 7b. A first axle bearing 18a for supporting the first end of the spool shaft 14 is housed in the spool support portion 17.

The first side cover 8a and the first side plate 7a rotatably support a drive shaft 30 that rotates with the handle 2 (refer to FIG. 3). The second side cover 8b is, for example, screwed to the outer edge of the second side plate 7b.

The handle 2 is disposed on the first side cover 8a side. The handle 2 comprises a handle arm 2a and a handle grip 2b that is mounted to the distal end of the handle arm 2a, as shown in FIG. 1.

Spool

The spool 10 is integrally and rotatably mounted to the spool shaft 14. The spool shaft 14 is fixed to the inner peripheral part of a line winding cylinder part 10a by an appropriate fixing method or device, such as by press fitting.

The first end of the spool shaft 14 is supported in the spool support portion 17 by the first axle bearing 18a, as described above. A second end (the right end in FIG. 2) of the spool shaft 14 is supported by the first side cover 8a via a second axle bearing 18b.

A clutch pin 16a that forms the clutch mechanism 16 is mounted further on the second axle bearing 18b side than the spool fixing portion of the spool shaft 14, extending in the radial direction.

Spool Drive Mechanism

The spool drive mechanism 13 drives the spool 10 in the line winding direction. In addition, the above generates a drag force on the spool 10 during winding to prevent the fishing line from breaking. Meanwhile, in the explanation of the spool drive mechanism 13, an explanation of the drag mechanism from the motor to the spool 10 has been omitted.

As shown in FIG. 3, the spool drive mechanism 13 comprises a drive shaft 30 to which the handle 2 is integrally and rotatably mounted, a drive gear 31, a drag mechanism 23, and a stepped gear that is not diagrammed. The rotation of the handle 2 is transmitted to an intermediate gear 61 via the drive shaft 30, the drag mechanism 23 and the stepped gear. A pinion gear 32 meshes with the intermediate gear 61.

The pinion gear 32 is mounted to the side plate body 19a rotatably around the spool shaft 14, as well as movably in the axial direction, as shown in FIG. 2. The pinion gear 32 is controlled by the clutch control mechanism 20 and moves on the outer peripheral side of the spool shaft 14 in the axial direction, between the clutch-on position shown in FIG. 2 and the clutch-off position, which is further to the right side than the clutch-on position in FIG. 2. The pinion gear 32 engages with a clutch yoke 41 and moves in the spool shaft 14 direction.

The drive shaft 30 (refer to FIG. 3) is prohibited from rotating in the line casting direction by a one-way clutch that is not shown. As shown in FIG. 3, the drive gear 31 is rotatably mounted to the drive shaft 30. The rotation of the drive gear 31 in the line casting direction can be braked by the drag mechanism 23. Consequently, the rotation of the spool 10 in the line casting direction can be braked.

Clutch Mechanism

The clutch mechanism 16 comprises a clutch pin 16a and a clutch recess 16b that is recessed in a cross shape on the left-side end surface of the pinion gear 32 along the radial direction, as shown in FIG. 2. The pinion gear 32 forms the clutch mechanism 16 and, at the same time, forms the spool drive mechanism 13. As described above, the pinion gear 32 moves between the clutch-on position and the clutch-off position shown in FIG. 2.

In the clutch-on position, the clutch pin 16a engages the clutch recess 16b, the rotation of the pinion gear 32 is transmitted to the spool shaft 14, and the clutch mechanism 16 is put in the clutch-on state. In this clutch-on state, the pinion gear 32 and the spool shaft 14 can integrally rotate. Additionally, in the clutch-off position, the clutch recess 16b separates from the clutch pin 16a, and the rotation of the pinion gear 32 is not transmitted to the spool shaft 14. For this reason, the clutch mechanism 16 is put in a clutch-off state, and the spool 10 is freely rotatable.

Clutch Control Mechanism

The clutch control mechanism 20 switches the clutch mechanism 16 between the clutch-on and the clutch-off states with the movement of the clutch operating member 11 between the clutch-on position and the clutch-off position. The clutch control mechanism 20 comprises a clutch cam 40, a clutch yoke 41, and a clutch plate 42, as shown in FIG. 3. The clutch cam 40 rotates around the spool shaft 14 between a first position (the clutch-on position) and a second position (the clutch-off position). The clutch yoke 41 engages the clutch cam 40. The clutch plate 42 couples the clutch cam 40 and the clutch operating member 11. The clutch plate 42 integrally rotates with the clutch cam 40. The clutch cam 40 is rotatably supported by the mechanism mounting plate 19b. The clutch cam 40 comprises a pair of cam portions 40a for moving the clutch yoke 41 by rotation.

The clutch yoke 41 is disposed so as to move the pinion gear 32 in the spool shaft direction to the clutch-off position and the clutch-on position. The clutch yoke 41 comprises a cam receiving part (not shown) that engages the cam portion 40a of the clutch cam 40, as well as an arcuate portion 41a that engages the pinion gear 32. The clutch yoke 41 moves from the clutch-on position to the clutchoff position that is outward in the spool shaft direction (the right side in FIG. 2) when the clutch cam 40 rotates from the first position to the second position. Consequently, the pinion gear 32 moves to the clutch-off position that is axially outward (the right side in FIG. 2), the engagement between the pinion gear 32 and the clutch pin 16a is released, and the clutch mechanism 16 is put in the clutch-off state. The clutch yoke 41 is guided in the axial direction by a pair of guide shafts 49, which are mounted to the mechanism mounting plate 19b, shown in FIG. 2. As shown in FIG. 3, the clutch yoke 41 is biased toward the clutch-on position by a pair of coil springs 44 that are mounted to the guide shaft 49. Therefore, when the clutch cam 40 rotates from the second position to the first position, the clutch yoke 41 returns from the clutch-off position to the clutch-on position, and the pillion gear 32 returns to the clutch-on position. Meanwhile, the return operation of the clutch cam 40 from the second position to the first position is achieved by an operation of the clutch operating member 11 using the first operating unit 52 described below or by an operation of a clutch return mechanism 60 that is operated by the rotation of the handle 2 in the line winding direction in the clutch-off state. As shown in FIG. 3, the clutch return mechanism 60 is formed by a clutch pawl 62 that is coupled with the clutch cam 40, as well as by a ratchet wheel 64 that is integrally and rotatably coupled with the drive shaft 30.

The clutch plate 42 rotates the clutch cam 40 with the pivoting of the clutch operating member 11. The clutch plate 42 is formed by, for example, bending a metal plate. The clutch plate 42 comprises an engagement portion 42a that engages with the clutch cam 40 and a mounting portion 42b that is bent toward the clutch operating member 11 after extending from the engagement portion 42a in the radial direction. The engagement portion 42a rotates in conjunction with the rotation of the clutch cam 40. The mounting portion 42b is fixed to the clutch operating member 11 by, for example, a screw member.

Clutch Operating Member

Figure 4:
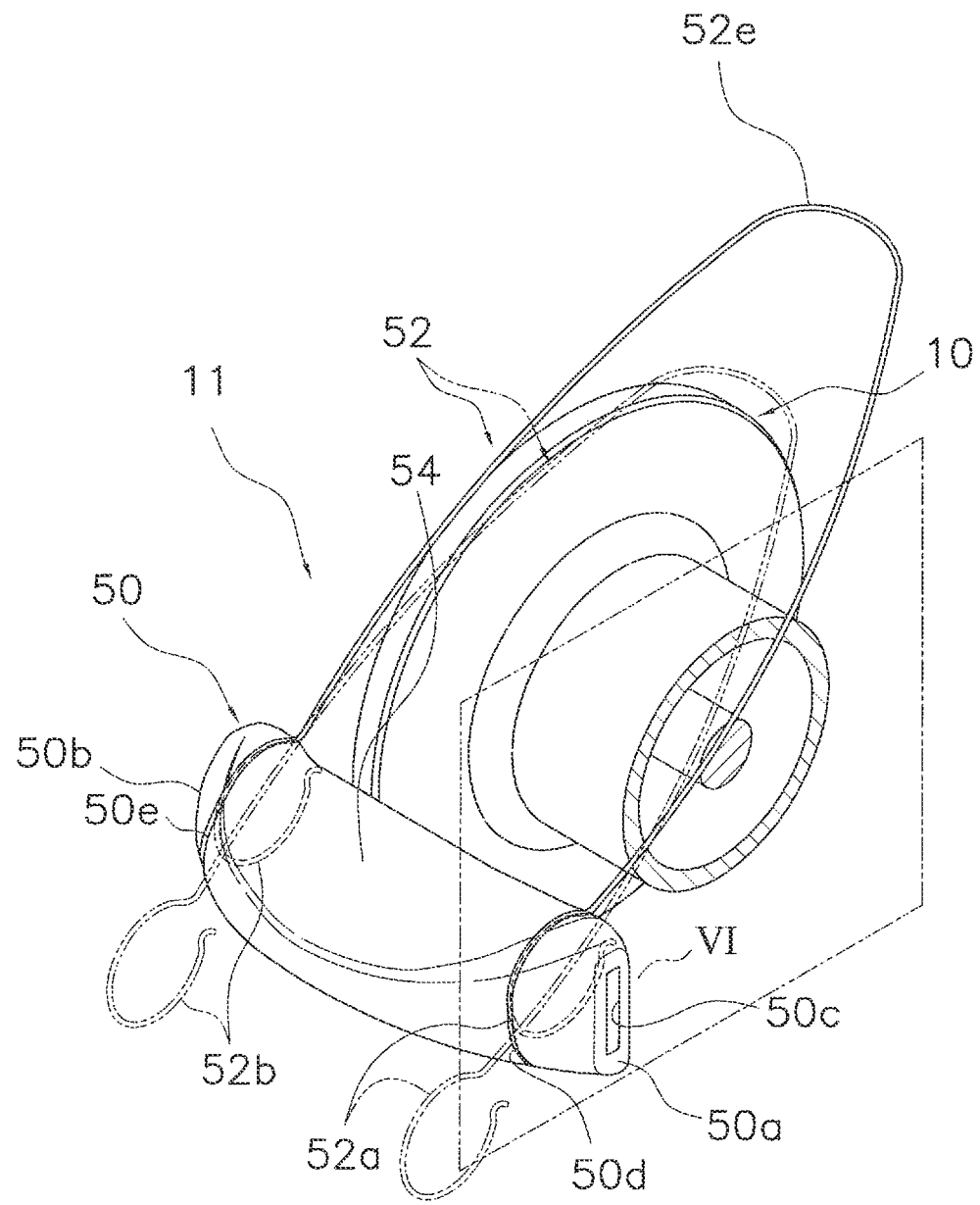
FIG. 4 is a perspective view of the clutch operating member.
Figure 5:
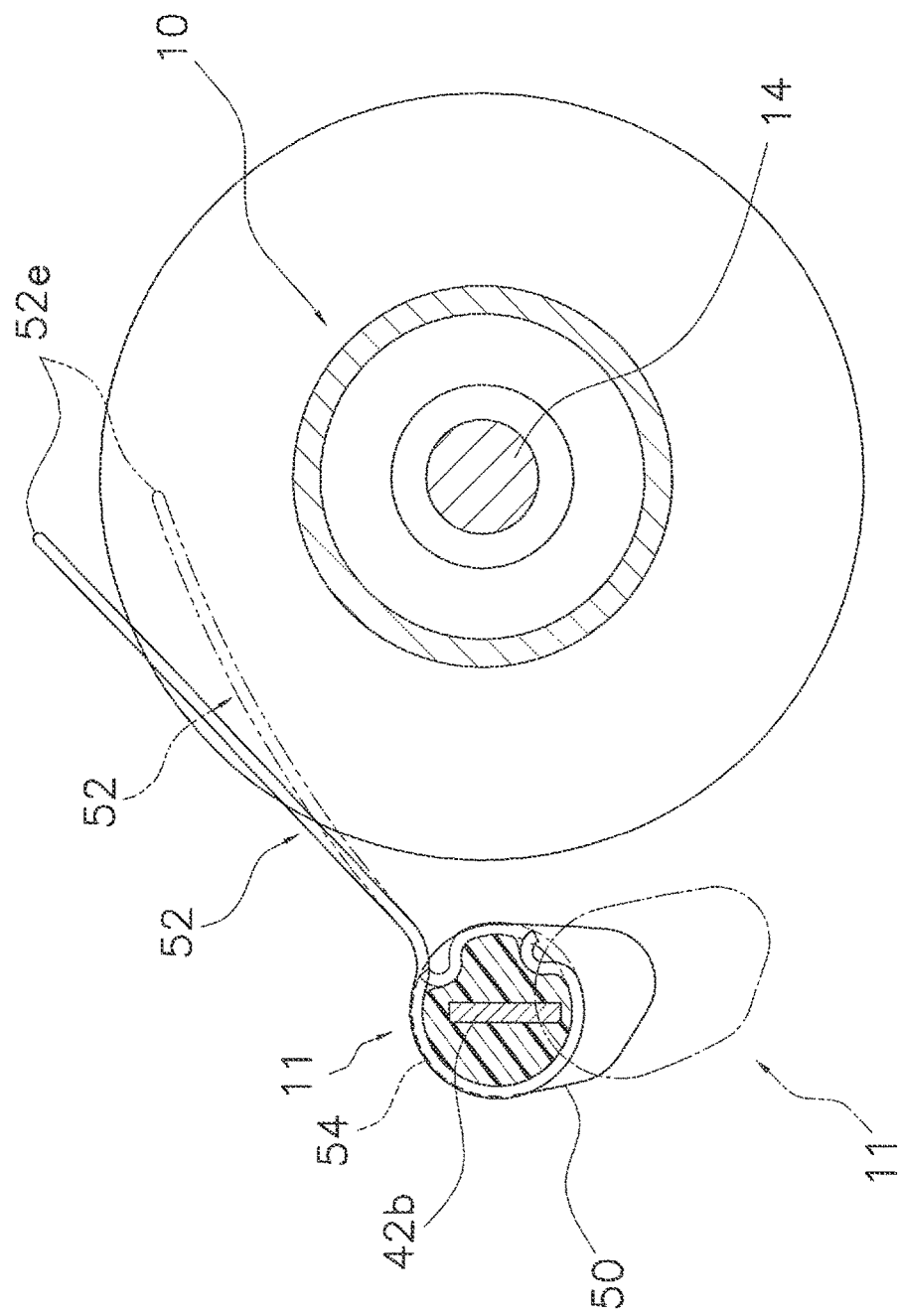
FIG. 5 is a partial cross-sectional view taken along the virtual sectional plane VI in FIG. 4.

As shown in FIG. 3, FIG. 4 and FIG. 5, the clutch operating member 11 at least returns the clutch mechanism 16 to the clutch-off state and the clutch-on state. In the first embodiment, the clutch operating member 11 is able to switch the clutch mechanism 16 between the clutch-on state and the clutch-off state. The clutch operating member 11 is disposed in the rear of the reel body 1 between the first side plate 7a and the second side plate 7b to be movable in the direction that approaches and separates from the fishing rod mounting portion 7g. In the first embodiment, the clutch operating member 11 is pivotably disposed about the axis of the spool shaft 14. The clutch operating member 11 pivots between the clutch-on position. Which is shown by the solid line in FIG. 5, and the clutch-off position, which is closer to the fishing rod mounting portion 7g than the clutch-on position, as shown by the dashed line in FIG. 5. When the clutch operating member 11 is moved to the clutch-on position, the clutch mechanism 16 is put in the clutch-on state. When the clutch operating member 11 is moved to the clutch-off position, the clutch mechanism 16 is put in the clutch-off state.

As shown in FIG. 3, a first contact plate 43a and a second contact plate 43b are separately mounted to the inner side surface of the rear of the first side plate 7a and the rear of the second side plate 7b. The first contact plate 43a and the second contact plate 43b both have an arcuate passage hole 43c through with the mounting portion 42b of the clutch plate 42 can extend and pivot. The first contact plate 43a and the second contact plate 43b are members made of a highly slidable synthetic resin, such as polyacetal. The first contact plate 43a and the second contact plate 43b are separately and detachably fitted to the first side plate 7a and the second side plate 7b. The clutch operating member 11 has a length such that the two ends can come into contact with the first contact plate 43a and the second contact plate 43b. Therefore, in the first embodiment, the clutch operating member 11 is supported by the reel body 1 at both ends.

Figure 6:
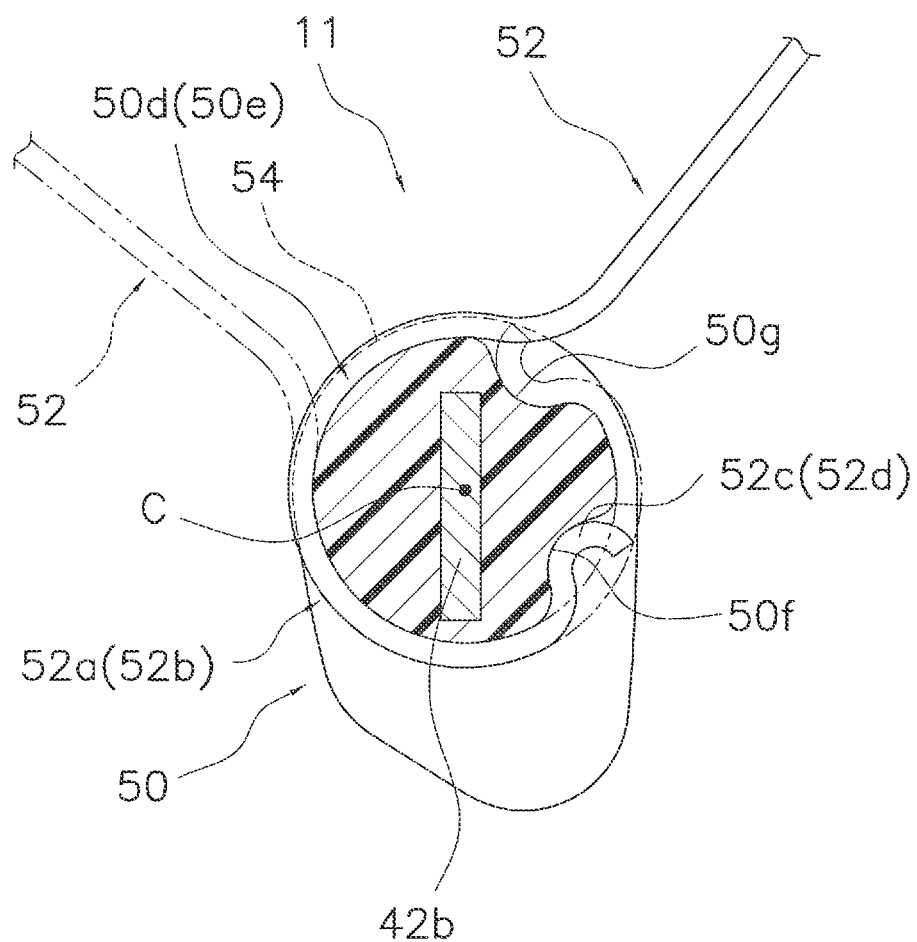
FIG. 6 is an enlarged cross-sectional view of FIG. 5.

The clutch operating member 11 comprises a movable part 50, a first operating unit 52, and a second operating unit 54, as shown in FIG. 4, FIG. 5, and FIG. 6. The movable part 50 is movably disposed on the reel body 1 between the clutch-on position and the clutch-off position. Both ends (e.g., first and second ends) of the first operating unit 52 are pivotably coupled with the movable part 50. The second operating unit 54 is disposed on the movable part 50. The movable part 50 is movably disposed between the first side plate 7a and the second side plate 7b. The movable part 50 comprises a first contact surface 50a and a second contact surface 50b that can each come in contact with the first contact plate 43a and the second contact plate 43b at both ends. Additionally, the movable part 50 comprises a through-hole 50c with a rectangular cross-section that is fixed to the mounting portion 42b of the clutch plate 42. The through-hole 50c is formed to extend through the first contact surface 50a and the second contact surface 50b. The through-hole 50c is formed in a rectangular shape that is substantially equal to the thickness and width of the mounting portion 42b of the clutch plate 42. The mounting portion 42b of the clutch plate 42 is disposed extending through the first contact plate 43a, the through-hole 50c, and the second contact plate 43b. The movable part 50 is thereby mounted to the mounting portion 42b. Therefore, in the first embodiment, the movable part 50 is mounted to the mounting portion 42b with both ends sandwiched by the first contact plate 43a and the second contact plate 43b and is not fixed by a fixing member, such as a screw. A second operating unit 54 is formed to be curved so that the center portion is slightly recessed on the upper surface of the movable part 50. The second operating unit 54 moves the movable part 50 downward from the clutch-on position to the clutch-off position.

The first operating unit 52 is pivotably coupled to the movable part 50 at both ends and returns the movable part 50 from the clutch-off position to the clutch-on position. The first operating unit 52 can, for example, be made of a metal wire having elasticity. In the first embodiment, the first operating unit 52 is formed by bending a spring wire. The length of the first operating unit 52 is longer than the gap between the first side plate 7a and the second side plate 7b. The first operating unit 52 is disposed, for example, to be curved in an inverted U-shape. The first operating unit 52 is detachably disposed on the movable part 50, as shown by the chained double-dashed line in FIG. 4. The first operating unit 52 is coupled with the movable part 50 at both ends, pivotably between the initial position shown by the solid line and the pivot position, which is closer to the spool 10 than the initial position and in which thumbing is possible, as shown in FIG. 5. The pivot position can be obtained by applying three to the tip of the operating finger (for example, the tip of the thumb of the left hand gripping the electric reel 100) and flexing the first operating unit 52. Also, as shown in FIG. 6, the first operating unit 52 is rotatable about an axis C in the longitudinal direction between the operating position shown by the solid line in FIG. 6 and the open position shown by the chained double-dashed line. The axis C is an axis that passes through the center of a circular bottom of the first annular groove 50d mentioned below and that is parallel to the spool shaft 14.

In order to rotatably, pivotably, and detachably couple the first operating unit 52, a first annular groove 50d and a second annular groove 50e are disposed on the inside portion of the first contact surface 50a and the second contact surface 50b of the movable part 50 in the axial direction. As shown in FIG. 6, the first annular groove 50d and the second annular groove 500 are grooves in which the bottom is formed in a circular shape. A first positioning recess 50f and a second positioning recess 50g, which are disposed at an interval in the circumferential direction, are both formed on the bottom of the first annular groove 50d and the second annular groove 50e. The first positioning recess 50f is a positioning recess for positioning the first operating unit 52 in the operating position. The second positioning recess 50g is a positioning recess for positioning the second operating unit 54 in the open position.

A first attaching portion 52a that engages with the first annular groove 50d and a second attaching portion 52b that engages with the second annular groove 50e are formed at both ends of the first operating unit 52. The first attaching portion 52a and the second attaching portion 52b are formed to be curved in an arc shape in a range that exceeds around 180 degrees (for example, in a range of about 240 degrees). Therefore, the distal end portions of the first attaching portion 52a and the second attaching portion 52b are open.

A first positioning portion 52c for positioning the first operating unit 52 to the operating position and the open position by engaging with the first positioning recess 50f and the second positioning recess 50g is formed to be curved radially inward in the distal end portion of the first attaching portion 52a. A second positioning portion 52d for positioning the first operating unit 52 to the operating position and the open position by engaging with the first positioning recess 50f and the second positioning recess 50g is also formed to be curved radially inward in the distal end portion of the second attaching portion 52b. Meanwhile, the first positioning recess 50f and the second positioning recess 50g, as well as the first positioning portion 52c and the second positioning portion 52d, can be disposed only on one side, instead of on both sides.

When the first positioning portion 52c and the second positioning portion 52d engage with the first positioning recess 50f, the first operating unit 52 is positioned to the operating position shown by the solid line in FIG. 6. When the first positioning portion 52c and the second positioning portion 52d engage with the second positioning recess 50g, the first operating unit 52 is positioned to the open position shown by the chained double-dashed line in FIG. 6. When the first operating unit 52 is positioned to the operating position, it is possible to perform a thumbing operation by pivoting the curved center portion 52e of the first operating unit 52 (refer to FIG. 4 and FIG. 5) to the pivot position with the tip of the thumb of the hand that is holding the electric reel 100 (for example, the left hand in the case of a right handle); at the same time, it is possible to perform a clutch return operation folio wing the thumbing operation.

Operation of the Dual-Bearing Reel

In an electric reel 100 configured in this manner, when fishing, the angler will, for example, push down the second operating unit 54 of the clutch operating member 11 with the thumb of the hand that is holding the fishing rod. Accordingly, the clutch mechanism 16 switches from the clutch-on state to the clutch-off state, and the spool 10 is put in a free rotational state. Then, the fishing line unreels by the weight of the tackle, and the tackle is dropped to the ledge position where fish are schooling up. At the time of casting the fishing line, the thumb extends towards the first operating unit 52 when performing thumbing with respect to the spool 10. Then, the first operating unit 52 is flexed by applying force to the tip of the thumb in a state in which the distal end portion of the thumb is in contact with the center portion 52e of the first operating unit 52. Accordingly, the first operating unit 52 can be positioned in the pivot position shown by the chained double-dashed line in FIG. 5. When the first operating unit 52 pivots to the pivot position, the center portion 52e of the first operating unit 52 approaches the spool 10. As a result, the proximal side, rather than the distal end portion, of the finger that operates the first operating unit 52 can come in contact with the fishing line that is wound to the spool 10. Then, when the tackle reaches the ledge position, the clutch operating member 11 can be returned from the clutch-off position to the clutch-on position by pushing up the center portion 52e of the first operating unit 52 with the distal end portion of the thumb that was used for the thumbing. Thus, it is possible to instantaneously perform a clutch return operation from a thumbing operation. When a fish is hooked in this state, it is possible to land the fish by winding the fishing line with the handle 2.

Additionally, in the case of backlash, the first operating unit 52 rotates to the rear. When the first operating unit 52 rotates rearward, the first positioning portion 52c and the second positioning portion 52d of the first operating unit 52, which is positioned on the first positioning recess 50f, is disengaged from the first positioning recess 50f. Then, when the first positioning portion 52c and the second positioning portion 52d reach the second positioning recess 50g, the first positioning portion 52c and the second positioning portion 52d engage with the second positioning recess 50g due to elasticity, and they are positioned in the open position. In this open position, an Obstructive member will be eliminated from the line winding portion of the spool 10, thereby making it easier to access to the spool 10 and deal with backlash. Additionally, it is possible to remove the first operating unit 52 when fishing without using the first operating unit 52. When removing the first operating unit 52, if the first operating unit 52 disposed in the operating position is moved diagonally downward, the first attaching portion 52a and the second attaching portion 52b will spread elastically, and the first operating unit 52 will disengage from the first annular groove 50d and the second annular groove 50e.

Second Embodiment

Figure 7:
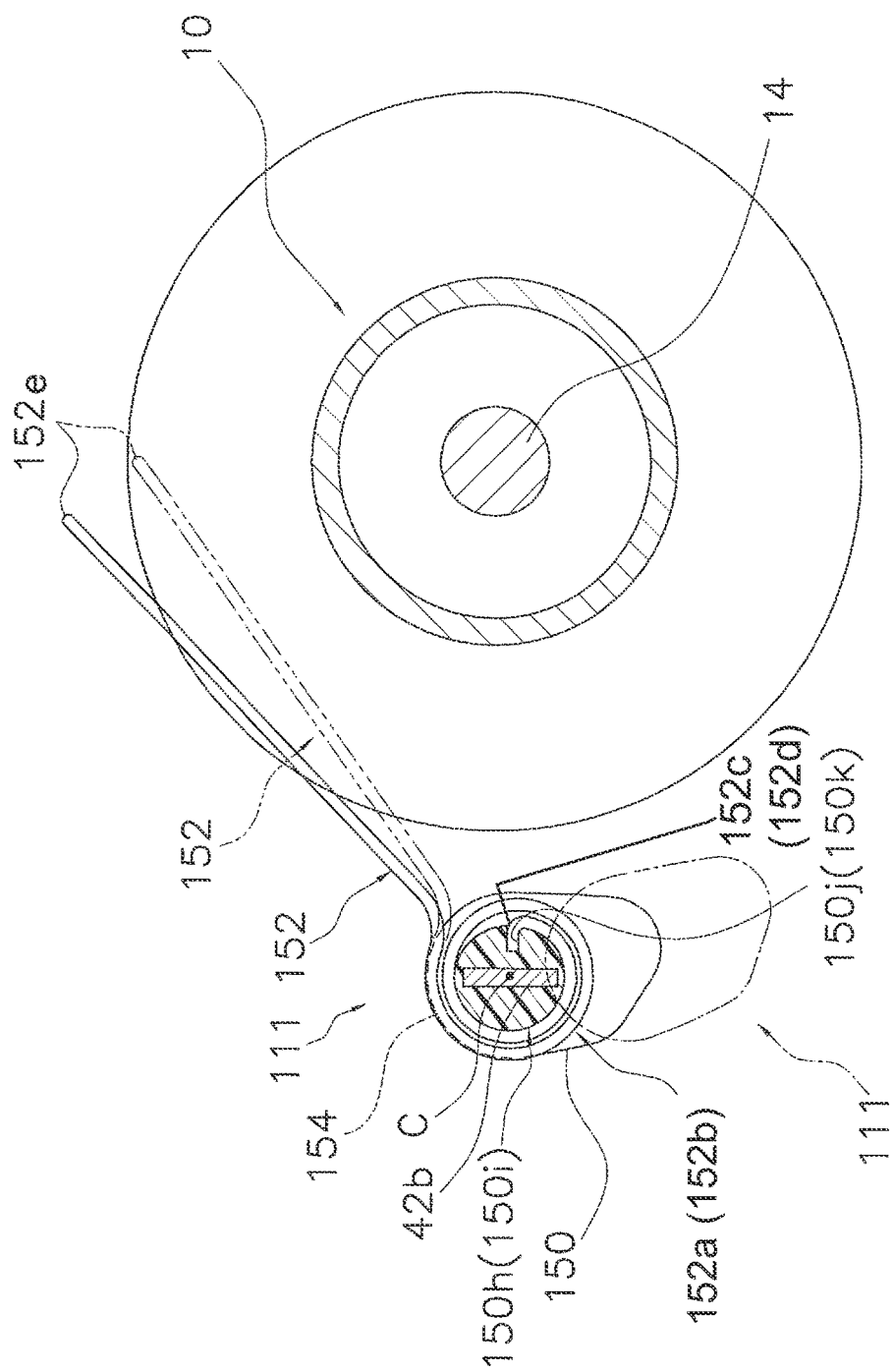
FIG. 7 is a diagram of the second embodiment corresponding to FIG. 5.

In the first embodiment, the first operating unit 52 is pivoted by flexing, but in the second embodiment, the first operating unit 152 is configured to approach the spool 10 by being pivoted about the axis C, as shown in FIG. 7. In FIG. 7, the movable part 150 comprises a first attaching recess 150h and a second attaching recess 150i, which are formed recessed axially inwards in an annular shape from the first contact surface and the second contact surface, which are not diagrammed. A first locking groove 150j and a second locking groove 150k are formed in the first attaching recess 150h and the second attaching recess 150i, extending axially inwards from the first contact surface and the second contact surface.

A first attaching portion 152a and a second attaching portion 152b, which are mounted to the first attaching recess 150h and the second attaching recess 150i, are formed at both ends of the first operating unit 152. The first attaching portion 152a and the second attaching portion 152b are formed by a spiral spring that is curved in a spiral shape. In the second embodiment, the first attaching portion 152a and the second attaching portion 152b are formed by a double spiral spring. A first locking portion 152c and a second locking portion 152d, which bent radially inwards, are disposed on the distal end portions of the first attaching portion 152a and the second attaching portion 152b. The first locking portion 152c is locked by the first locking groove 150j, and the second locking portion 152d is locked by the second locking groove 150k.

In the second embodiment, the first operating unit 152 is not pivoted by being flexed; however, when force is applied to the center portion 152e of the first operating unit 152 with the fingertip and the first operating unit 152 approaches the spool 10, the spiral springs of the first attaching portion 152a and the second attaching portion 152b extend, and the center portion 152e will substantially pivot about the axis C. The same effects as those of the first embodiment can be achieved even with a clutch operating member 111 configured in this way.

Other Embodiments

One embodiment of the present invention was described above, but the present invention is not limited to the above-described embodiment; various modifications can be made without departing from the scope of the invention. In particular, the various embodiments and modified examples described in the present Specification can be freely combined according to necessity (a) In the first and the second embodiments, the clutch operating member 11 is supported at both ends with the first side plate 7a and the second side plate 7b, but the present invention is not limited thereto. The clutch operating member can also be cantilevered on the first side plate side.

(b) In the first and second embodiments, the clutch operating member 11 is pivoted about the spool shaft 14, but the clutch operating member can be moved in any way as long as the movement is in a direction that approaches and separates from the fishing rod mounting portion 7g. For example, the clutch operating member can be pivoted about an axis that is different from the spool shaft or can be linearly moved up and down.

(c) In the first and second embodiments, a first operating unit 52 made of metallic wire having elasticity is disclosed, but the present invention is not limited thereto. The first operating unit can be configured by a non-metallic member, such as a synthetic resin having elasticity. The first operating unit can also be configured by a metal or a non-metal without elasticity. In this embodiment, elasticity can be obtained by separately providing an elastic member.

(d) In the first and the second embodiments, an electric reel 100 is exemplified as the dual-bearing reel, but the present invention can also be applied to a normal, hand-wound dual-bearing reel.

(e) In the first embodiment, the first operating unit 52 is configured so as to be detachable with respect to the movable part 50, but the present invention is not limited thereto. The first operating unit can be configured to not be detachable with respect to the movable part. (a) In the first embodiment, the first operating unit 52 is configured to be rotatable between an operating position and an open position, but this may also be configured to not rotate.

Characteristics

The embodiment described above can be expressed as the following.

(A) A clutch operating member 11 of an electric reel 100 is disposed in the rear of a reel body 1 of the electric reel 100 for casting fishing line in a forward direction. The clutch operating member 11 returns a clutch mechanism 16 from a clutch-off state to a clutch-on state. The clutch operating member 11 comprises a movable part 50 and a first operating unit 52. The movable part 50 is movably disposed on the reel body 1 between a clutch-off position for putting the clutch mechanism 16 in the clutch-off state and a clutch-on position for putting the clutch mechanism in the clutch-on state. The first operating unit 52 is pivotably coupled to the movable part 50 at both ends and returns the movable part 50 from the clutch-off position to the clutch-on position.

In this clutch operating member 11 of the electric reel 100, the movable part 50 is moved from the clutch-on position to the clutch-off position when putting the clutch mechanism 16 in the clutch-off state and casting the fishing line. Additionally, the movable part 50 is returned from the clutch-off position to the clutch-on position by operating the first operating unit 52 when returning the clutch mechanism 16 from the clutch-off state to the clutch-on state. The first operating unit 52 is pivotably coupled to the movable part 50 at both ends. For this reason, it is possible to perform a thumbing operation by pivoting the first operating unit 52 in a direction that approaches the spool 10 in a state in which a finger (thumb) presses the first operating unit 52. Accordingly, it is possible to instantaneously perform a clutch return operation from a thumbing operation.

(B) The first operating unit 52 can be made of a metal wire having elasticity. In this embodiment, making the first operating unit 52 have an inconspicuous appearance is possible by bending the metal wire into an inverted U-shape and pivotably connecting both ends to the movable part 50. Additionally, emphasizing the characteristics of the appearance of the first operating unit 52 is possible by conducting a decoration process, such as plating.

(C) The reel body 1 comprises a first side plate 7a and a second side plate 7b that are disposed at an interval in a lateral direction that intersects with the longitudinal direction of the reel body 1. The movable part 50 can be movably disposed between the first side plate 7a and the second side plate 7b. In this embodiment, since the movable part 50 is guided at both ends, the movable part 50 is less likely to tilt laterally.

(D) The length of the first operating unit 52 can be longer than the gap between the first side plate 7a and the second side plate 7b. In this embodiment, it is possible to easily bend the first operating unit 52.

(E) The first operating unit 52 can be disposed so as to be curved. In this embodiment, operating the first operating unit 52 with the thumb of a hand that is gripping the dual-bearing reel 100 is easy.

(F) The first operating unit 52 can be detachably disposed on the movable part 50. In this embodiment, an angler performing a clutch-on operation without using the first operating unit 52 is able to detach the first operating unit 52 and select a first operating unit 52 according to the preference of the angler. For example, an angler who selects the clutch-on position with the movable part 50 or an angler who performs an operation to return the clutch mechanism 16 from the clutch-off position to the clutch-on position with the rotation of a handle 2 in the line winding direction can detach the first operating unit.

(G) The first operating unit 52 can be movably coupled with the movable part 50 in the longitudinal direction at both ends. In this embodiment, since the first operating unit 52 rotates in the longitudinal direction, it is possible to perform a clutch-on operation from the rearward position, and dealing with backlash from the rearward position is easy.

(H) The clutch operating member 11 can further comprise a second operating unit 54 that is disposed on the movable part 50 and moves the movable part from the clutch-on position to the clutch-off position. In this embodiment, using the second operating unit 54 to move from the clutch-on position to the clutch-off position is easy.

What is claimed is:

1. A clutch operating member for a dual-bearing reel disposed at a rear of a reel body of the dual-bearing reel and for casting a fishing line in a forward direction, the clutch operating member comprising:
    a movable part movably disposed on the reel body, and being configured to be selectively disposed between a clutch-off position Which sets a clutch mechanism in the clutch-off state and a clutch-on position which sets the clutch mechanism in the clutch-on state; and
    a first operating unit having a first end and a second end, being pivotably coupled to the movable part at the first and second ends, and being configured to return the movable part from the clutch-off position to the clutch-on position.

2. The clutch operating member of the dual-beating reel recited in claim 1, wherein the first operating unit is a metal wire having elasticity.

3. The clutch operating member of the dual-bearing reel recited in claim 2, wherein
    the reel body comprises a first side plate and a second side plate, the first and second side plates being disposed at an interval in a lateral direction that intersects a longitudinal direction of the reel body, and
    the movable part is movably disposed between the first side plate and the second side plate.

4. The clutch operating member of the dual-bearing reel recited claim 2, wherein
    the first operating unit is detachably disposed on the movable part.

5. The clutch operating member of the dual-bearing reel recited in claim 2, wherein
    the first operating unit is coupled to the movable part so that the first and second ends are rotatable in a longitudinal direction of the reel body.

6. The clutch operating member of the dual-bearing reel recited in claim 2, further comprising
    a second operating unit disposed on the movable part and being configured to move the movable part from the clutch-on position to the clutch-off position.

7. The clutch operating member of the dual-bearing reel recited in claim 1, wherein
    the reel body comprises a first side plate and a second side plate, the first and second side plates being disposed at an interval in a lateral direction that intersects a longitudinal direction of the reel body, and
    the movable part is movably disposed between the first side plate and the second side plate.

8. The clutch operating member of the dual-bearing reel recited in claim 7, wherein
    the first operating unit has a length that is longer than a gap formed between the first side plate and the second side plate.

9. The clutch operating member of the dual-bearing reel recited claim 7, wherein
    the first operating unit is detachably disposed on the movable part.

10. The clutch operating member of the dual-bearing reel recited in claim 7, wherein
    the first operating unit is coupled to the movable part so that the first and second ends are rotatable in the longitudinal direction of the reel body.

11. The clutch operating member of the dual-bearing reel recited in claim 7, wherein
    the first operating unit is curved.

12. The clutch operating member of the dual-bearing reel recited claim 11, wherein
    the first operating unit is detachably disposed on the movable part.

13. The clutch operating member of the dual-bearing reel recited in claim 11, wherein
    the first operating unit is coupled to the movable part so that the first and second ends are rotatable in a longitudinal direction of the reel body.

14. The clutch operating member of the dual-bearing reel recited claim 8, wherein the first operating unit is detachably disposed on the movable part.

15. The clutch operating member of the dual-bearing reel recited in claim 4, wherein
the first operating unit is coupled to the movable part so that the first and second ends are rotatable in a longitudinal direction of the reel body.

16. The clutch operating member of the dual-beating reel recited claim 8, wherein
the first operating unit is detachably disposed on the movable part.

17. The clutch operating member of the dual-bearing reel recited in claim 16, wherein
the first operating unit is coupled to the movable part so that the first and second ends are rotatable in a longitudinal direction of the reel body.

18. The clutch operating member of the dual-bearing reel recited in claim 1, wherein
the first operating unit is coupled to the movable part so that the first and second ends are rotatable in a longitudinal direction of the reel body.

19. The clutch operating member of the dual-bearing reel recited in claim 18, further comprising
a second operating unit disposed on the movable part and being configured to move the movable part from the clutch-on position to the clutch-off position.

20. The clutch operating member of the dual-bearing reel recited in claim 1, further comprising
a second operating unit disposed on the movable part and being configured to move the movable part from the clutch-on position to the clutch-off position.

* * * * *